United States Patent
Jorgensen et al.

(10) Patent No.: US 11,592,277 B2
(45) Date of Patent: Feb. 28, 2023

(54) CALIBRATION KIT FOR WORK MACHINE

(71) Applicant: DEERE & COMPANY, Moline, IL (US)

(72) Inventors: Peter J. Jorgensen, Dubuque, IA (US); Michael Peat, Dubuque, IA (US); Craig Christofferson, Dubuque, IA (US); David Veasy, Dubuque, IA (US); Shannon Massingill, Platteville, WI (US)

(73) Assignee: DEERE & COMPANY, Moline, IL (US)

( * ) Notice: Subject to any disclaimer, the term of this patent is extended or adjusted under 35 U.S.C. 154(b) by 1017 days.

(21) Appl. No.: 16/356,221

(22) Filed: Mar. 18, 2019

(65) Prior Publication Data
US 2020/0300595 A1    Sep. 24, 2020

(51) Int. Cl.
| | | |
|---|---|---|
| G01B 5/00 | (2006.01) | |
| B62D 53/00 | (2006.01) | |
| G01B 11/14 | (2006.01) | |
| E02F 9/00 | (2006.01) | |
| E02F 9/26 | (2006.01) | |

(52) U.S. Cl.
CPC ............ *G01B 5/0004* (2013.01); *B62D 53/00* (2013.01); *E02F 9/006* (2013.01); *G01B 11/14* (2013.01); *E02F 9/26* (2013.01)

(58) Field of Classification Search
CPC ...... G01B 5/0004; G01B 11/14; B62D 53/00; E02F 9/006; E02F 9/26; E02F 3/847; E02F 9/264
See application file for complete search history.

(56) References Cited

U.S. PATENT DOCUMENTS

| | | | |
|---|---|---|---|
| 3,856,089 A | 12/1974 | Rivinius | |
| 3,887,012 A * | 6/1975 | Scholl | G01C 15/006 356/138 |
| 4,162,708 A | 7/1979 | Johnson | |
| 4,273,196 A * | 6/1981 | Etsusaki | E02F 3/841 250/203.3 |
| 4,820,041 A | 4/1989 | Davidson et al. | |
| 4,918,821 A * | 4/1990 | Bjork | G01B 11/275 33/203.18 |
| 5,168,632 A * | 12/1992 | Rimlinger, Jr. | G01B 5/255 33/203.18 |

(Continued)

FOREIGN PATENT DOCUMENTS

| | | |
|---|---|---|
| DE | 3610666 A1 | 10/1987 |
| JP | 2017181340 A | 10/2017 |

OTHER PUBLICATIONS

German Search Report issued in counterpart application No. 102020203308.0 dated Feb. 10, 2021 (10 pages).

*Primary Examiner* — Nimeshkumar D Patel
*Assistant Examiner* — Tania Courson
(74) *Attorney, Agent, or Firm* — Taft Stettinius & Hollister LLP; Stephen F. Rost (57) ABSTRACT

Machines, calibration kits for machines, and methods of calibrating machines are disclosed herein. A machine includes a chassis, a frame, and a calibration kit. The chassis has a first coupling element and the frame has a second coupling element configured for interaction with the first coupling element to pivotally couple the frame to the chassis. The calibration kit is coupled to the chassis adjacent the second coupling element.

20 Claims, 7 Drawing Sheets

(56) References Cited

U.S. PATENT DOCUMENTS

| | | | |
|---|---|---|---|
| 9,901,021 B2* | 2/2018 | Phan | G01D 5/20 |
| 11,124,943 B2* | 9/2021 | Kean | E02F 3/765 |
| 11,136,744 B2* | 10/2021 | Myers | E02F 9/26 |
| 11,162,246 B2* | 11/2021 | Kean | E02F 3/7636 |
| 11,274,416 B2* | 3/2022 | Veasy | E02F 3/7654 |
| 2004/0049930 A1* | 3/2004 | Murray | G01B 11/27 33/288 |
| 2013/0206432 A1 | 8/2013 | Staade et al. | |
| 2015/0308826 A1 | 10/2015 | Seki | |
| 2020/0362535 A1* | 11/2020 | Veasy | E02F 3/845 |
| 2021/0340729 A1* | 11/2021 | Sulzer | E02F 9/02 |
| 2022/0106771 A1* | 4/2022 | Wuisan | E02F 3/7609 |

* cited by examiner

CALIBRATION KIT FOR WORK MACHINE

FIELD OF THE DISCLOSURE

The present disclosure relates, generally, to a calibration kit for a work machine such as a construction or harvesting machine, and, more specifically, to a motor grader.

BACKGROUND

Operation of machines such as motor graders may be associated with, or otherwise require, precise measurement of geometries and/or locations of one or more components thereof to account for machine-to-machine variation. In some conventional configurations, measurements taken by an operator may be associated with undesirable human error. In other configurations, measurements may vary according to, and be dependent upon, the particular implement mounted to the front of the grader. Devices or methods for measurement of geometries or locations of components of graders that avoid the aforementioned drawbacks remain an area of interest.

SUMMARY

The present disclosure may comprise one or more of the following features and combinations thereof.

According to one aspect of the present disclosure, a machine may include a chassis, a frame, and a calibration kit. The chassis may have a first coupling element. The frame may have a second coupling element configured for interaction with the first coupling element to pivotally couple the frame to the chassis. The calibration kit may be coupled to the chassis adjacent the second coupling element. The calibration kit may be configured to facilitate measurement of a center of the second coupling element of the frame to at least partially establish a positional reference frame for calibration of the machine. The calibration kit may be configured to retain a reference element at a reference location relative to the center of the second coupling element of the frame so that the reference location of the reference element may be used to measure the center of the second coupling element of the frame in use of the calibration kit.

In some embodiments, the calibration kit may include a bracket having a pair of crown projections that cooperate to define a V-shaped groove sized to interface with a mounting structure of the first coupling element in use of the calibration kit. When the mounting structure interfaces with the V-shaped groove of the bracket in use of the calibration kit and the bracket is aligned with the second coupling element of the frame in a horizontal direction, a vertical axis that passes through the center of the second coupling element of the frame may bisect the bracket. The calibration kit may include an alignment pin that extends outwardly from the chassis and interfaces with the bracket to align the vertical axis that bisects the bracket with a vertical axis of a main frame of the machine in use of the calibration kit. When the mounting structure interfaces with the V-shaped groove of the bracket and the bracket is aligned with the second coupling element of the frame in the horizontal direction by the alignment pin in use of the calibration kit, the reference location of the reference element relative to the center of the second coupling element of the frame may correspond to a vertical distance between the reference element and the center of the second coupling element of the frame.

In some embodiments, the calibration kit may include a bracket having a first end and a second end arranged opposite the first end, and the bracket may receive a mounting structure of the first coupling element adjacent the first end and retain the reference element at the reference location adjacent the second end in use of the calibration kit. The bracket may include a pair of crown projections that cooperatively define the first end and a V-shaped groove sized to receive the mounting structure of the first coupling element, and each of the pair of crown projections may be coupled to the chassis by a crown projection magnet in use of the calibration kit. The bracket may have a transition section that extends downwardly from the pair of crown projections, and the transition section may be coupled to the chassis by a transition section magnet positioned beneath each of the crown projection magnets in use of the calibration kit. The crown projection magnets and the transition magnet may be arranged on the bracket to form a V-shape in use of the calibration kit.

In some embodiments, the calibration kit may include an alignment pin that extends outwardly from the chassis and includes a neck having a first diameter and a shoulder interconnected with the neck that has a second diameter greater than the first diameter. The shoulder may be coupled to the chassis by a shoulder magnet in use of the calibration kit.

According to another aspect of the present disclosure, a calibration kit for a machine including a chassis having a first coupling element and a frame having a second coupling element sized for receipt by the first coupling element to pivotally couple the frame to the chassis may include a bracket and an alignment pin. The bracket may be configured for attachment to the chassis and have a pair of crown projections that cooperate to define a V-shaped groove sized to interface with a mounting structure of the first coupling element in use of the calibration kit. The bracket may be configured to retain a reference element in use of the calibration kit. The alignment pin may be configured for attachment to the chassis in use of the calibration kit. The alignment pin may be configured to interface with the bracket to align the bracket with the second coupling element of the frame in a horizontal direction in use of the calibration kit.

In some embodiments, the bracket and the alignment pin may cooperate to retain the reference element at a reference location relative to a center of the second coupling element of the frame so that the reference location of the reference element may be used to measure the center of the second coupling element of the frame in use of the calibration kit. Additionally, in some embodiments, the bracket may include a body that extends downwardly away from the pair of crown projections and is formed to include two slots, and a lowermost flange that extends downwardly away from the body and is formed to include an aperture to retain the reference element in use of the calibration kit. The alignment pin may include a neck having a first diameter and a shoulder interconnected with the neck that has a second diameter greater than the first diameter. The calibration kit may include a plurality of magnets configured to attach the bracket to the chassis in use of the calibration kit and an alignment pin magnet configured to attach the alignment pin to the chassis in use of the calibration kit, and the plurality of bracket magnets may include three magnets.

According to yet another aspect of the present disclosure, a method of operating a machine including a chassis having a first coupling element and a frame having a second coupling element sized for receipt by the first coupling element to pivotally couple the frame to the chassis may include mounting a reference element to a bracket of a calibration kit, coupling the bracket to the chassis adjacent the second coupling element, and coupling an alignment pin of the calibration kit to the chassis adjacent the second coupling element to interact with the bracket such that the reference element is retained by the bracket at a reference location relative to a center of the second coupling element of the draft frame.

In some embodiments, coupling the bracket to the chassis adjacent the second coupling element may include contacting a mounting structure of the first coupling element with the bracket such that the mounting structure interfaces with a V-shaped groove defined by a pair of crown projections of the bracket. Coupling the alignment pin to the chassis adjacent the second coupling element to interact with the bracket may include contacting the bracket with the alignment pin to align a vertical axis that bisects the bracket with a vertical axis of a main frame of the machine in use of the calibration kit such that the reference location of the reference element relative to the center of the second coupling element of the frame corresponds to a vertical distance between the reference element and the center of the second coupling element of the frame. The method may include directing a light beam at the reference element when the reference element is at the reference location, detecting the light beam refracted by the reference element when the reference element is at the reference location, and transmitting a signal indicative of the detected light beam to a controller of the machine to at least partially establish a positional reference frame for calibration of the machine.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

Figure 1:
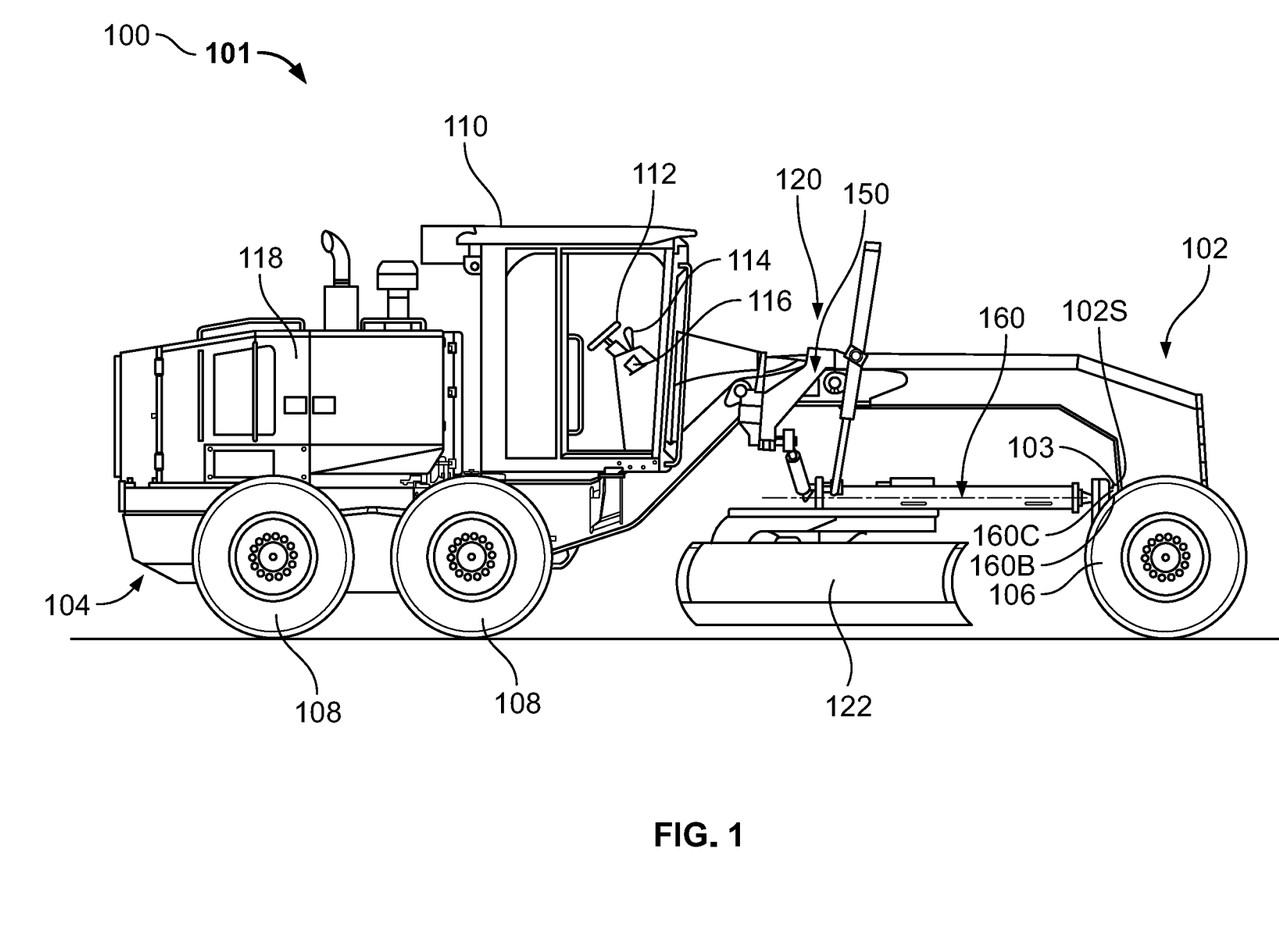
FIG. 1 is a side view of a motor grader.

Referring now to FIG. 1, a construction machine 100 is illustratively embodied as, or otherwise includes, a motor grader 101. It should be appreciated, however, that in other embodiments, the construction machine 100 may be embodied as, or otherwise include, equipment used in one or more of a variety of applications. In one example, the machine 100 may be embodied as, or otherwise include, a harvesting machine used in one or more applications. In another example, the machine 100 may be included in, or otherwise adapted for use with, equipment used in lawn and garden, construction, landscaping and ground care, golf and sports turf, forestry, engine and drivetrain, and government and military applications. In such embodiments, the machine 100 of the present disclosure may be included in, or otherwise adapted for use with, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, and marine engines, among other suitable equipment.

The illustrative motor grader 101 includes a front chassis or front frame 102 and a rear chassis or rear frame 104 arranged opposite the front chassis 102 and coupled thereto. The front and rear chassis 102, 104 may include, or otherwise be embodied as, portions of a main frame of the grader 101. The front chassis 102 is supported on a pair of front wheels 106 and the rear chassis is supported on tandem sets of rear wheels 108. The front chassis 102 supports an operator cab 110 in which various operational controls for the motor grader 101 are provided. Among other things, those controls may include a steering wheel 112, a lever assembly 114, and a dashboard 116.

In the illustrative embodiment, a drive unit or engine 118 mounted to the rear chassis 104 supplies driving power to all driven components of the motor grader 101. The drive unit 118 is embodied as, or otherwise includes, any device capable of supplying rotational power to driven components of the motor grader 101 to drive those components. In some embodiments, rotational power supplied by the drive unit 118 may be provided to the driven components of the grader 101 by one or more transmission(s). In one example, the drive unit 118 may be configured to supply power to a transmission that is coupled to the rear wheels 108 and operable to provide various predetermined speed ratios selectable by an operator in either reverse or forward operating modes. In another example, the drive unit 118 may be configured to supply power to a transmission that is coupled to the front wheels 106, such as a hydrostatic front-wheel-assist transmission. Additionally, in some embodiments, the drive unit 118 may be coupled to a pump or generator to provide hydraulic, pneumatic, or electrical power to one or more components of the motor grader 101, as the case may be.

The illustrative motor grader 101 includes a work implement assembly 120 that is movably coupled to the front chassis 102. The work implement assembly 120 includes a blade or moldboard 122 that is configured to grade an underlying surface in use of the grader 101. Of course, it should be appreciated that another suitable device may be employed to grade an underlying surface in use of the grader 101. In any case, multiple components of the work implement assembly 120 are adjustable and/or repositionable to cooperatively alter an orientation of the blade 122 via a saddle linkage 150 of the motor grader 101. The saddle linkage 150 is illustratively embodied as, or otherwise includes, a four-bar linkage that is supported for movement relative to the front chassis 102 and coupled to the work implement assembly 120. The saddle linkage 150 is lockable in one of a number of discrete operating positions that may define, be characterized by, or otherwise be associated with, corresponding positional states of one or more components of the saddle linkage 150 and/or the grader 101.

Figure 2:
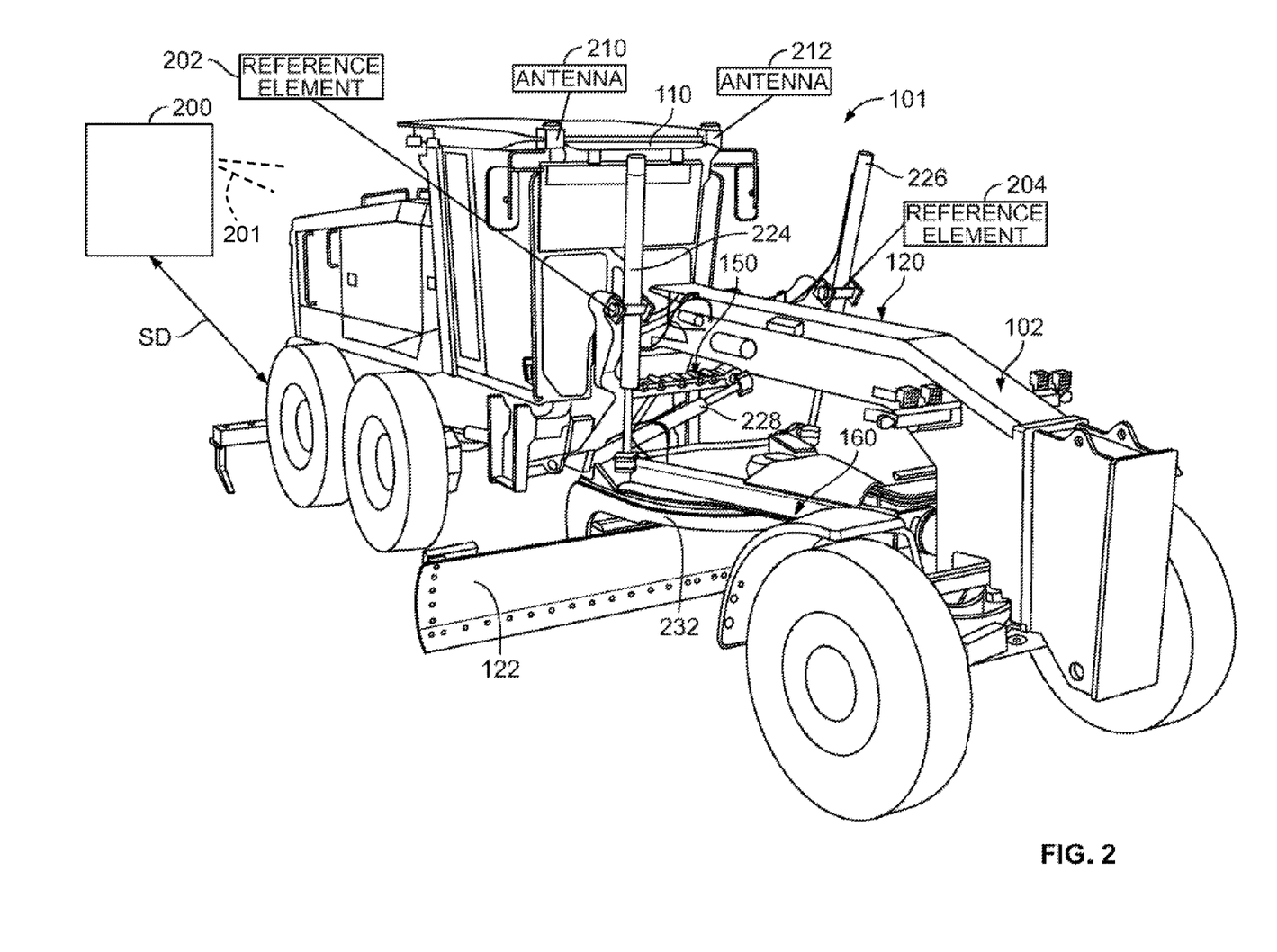
FIG. 2 is a partial diagrammatic view of the motor grader of FIG. 1 spaced from a reference station that may be used for calibration of the motor grader.

The illustrative motor grader 101 includes a draft frame, drawbar, or frame 160 that is movably coupled to the front chassis 102. The illustrative draft frame 160 is embodied as, or otherwise includes, an A-shaped structure pivotally coupled to the front chassis 102, as best seen in FIG. 2. It should be appreciated that for the purposes of the present disclosure, the draft frame or frame 160 is embodied as, or otherwise includes, a structure separate from the front chassis 102 that is configured for pivotal movement relative thereto. The front chassis 102 has a socket or coupling element 102S and the draft frame 160 has a ball or coupling element 160B sized for receipt by the socket 102S to pivotally couple the draft frame 160 to the front chassis 102 via a ball and socket coupling or coupling 103.

Figure 3:
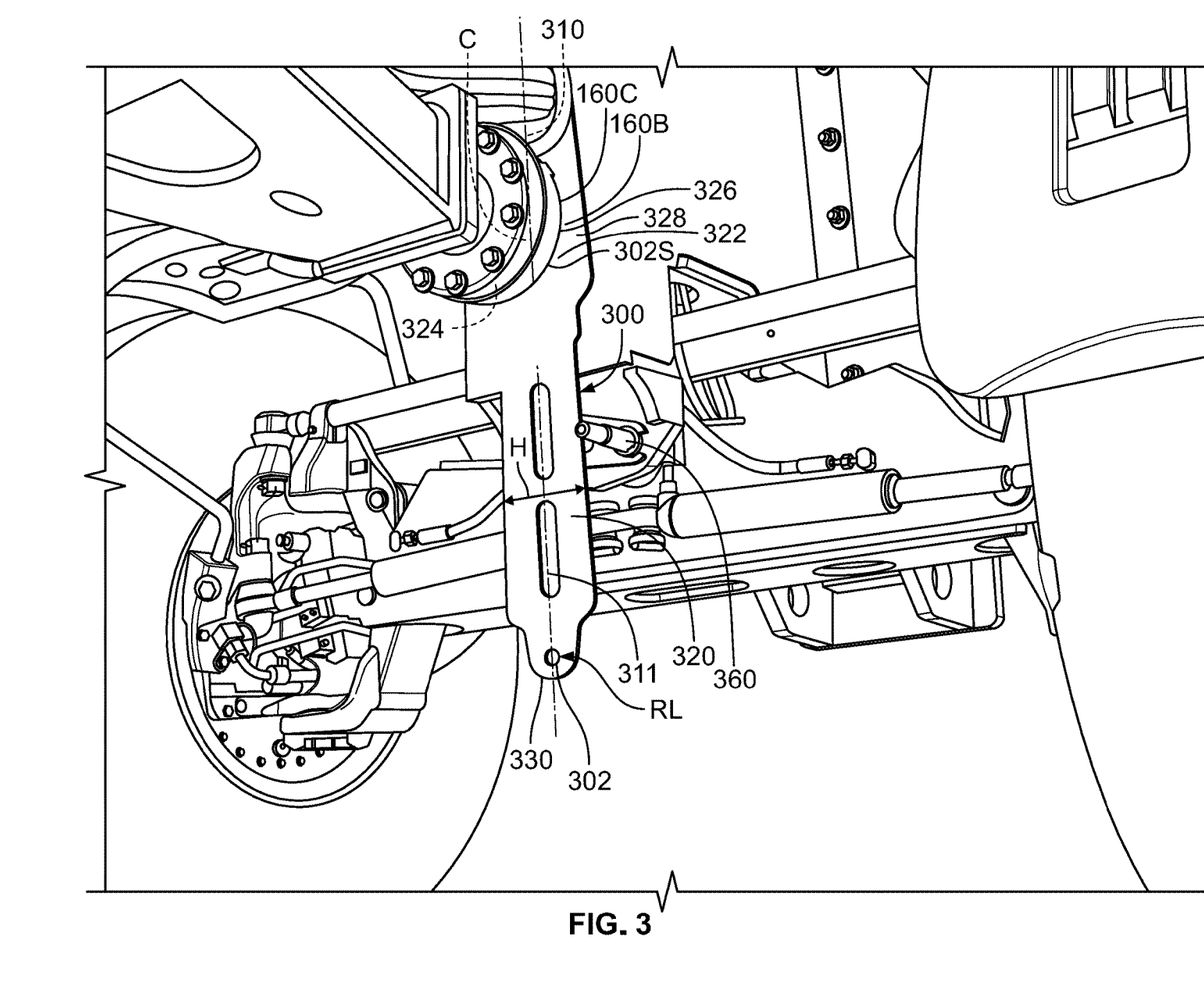
FIG. 3 is a magnified perspective view of the motor grader of FIG. 2 with a calibration kit coupled to a chassis of the motor grader adjacent a ball of a draft frame of the motor grader.

Referring now to FIGS. 2 and 3, a reference or total station 200 is adapted for use in conjunction with a calibration kit 300 to calibrate the motor grader 101, as described in greater detail below. It should be appreciated that in some embodiments, the motor grader 101, the reference station 200, and the calibration kit 300 may be included in a grading system. Additionally, it should be appreciated that in some embodiments, the reference station 200 and the calibration kit 300 may each be provided separately from the motor grader 101. In other embodiments, however, the motor grader 101 may include the reference station 200 and the calibration kit 300.

The illustrative calibration kit 300 is coupled to the front chassis 102 adjacent the ball 160B of the draft frame 160, as best seen in FIG. 3. The calibration kit 300 is configured to facilitate measurement of a center C of the ball 160B to at least partially establish a positional reference frame for calibration of the motor grader 101, as further discussed below. More specifically, the calibration kit 300 is configured to retain a reference element 302 at a reference location RL relative to the center C of the ball 160B so that the reference location RL may be used to measure the center C of the ball 160B in use of the calibration kit 300, as further discussed below.

With the aid of the calibration kit 300, the center C of the ball 160B of the draft frame 160 may be measured and/or located in a faster, more accurate, and more reproducible manner than measurement and/or location of the center C in other configurations. In the illustrative configuration, precise measurements at or near the reference location RL by hand (i.e., by a human operator or technician) using devices other than the calibration kit 300 may be avoided, thereby minimizing human error. Additionally, in the illustrative configuration, the calibration kit 300 may be used to measure and/or locate the center C of the ball 160B regardless of the component (e.g., the blade 122 or another suitable component) of the work implement assembly 120 that is movably coupled to the front chassis 102. It should be appreciated that use of the calibration kit 300 to measure and/or locate the center C of the ball 160B during calibration of the motor grader 101 facilitates, is associated with, or otherwise provides automatic centering (e.g., of the reference station 200) on the reference element 302 at the reference location RL in a manner that avoids measurement of some other reference point without the use of a reflector, for example.

In the illustrative embodiment, and as best seen in FIG. 2, the work implement assembly 120 includes a (left) lift cylinder 224, a (right) lift cylinder 226, a circle side shift cylinder 228, the draft frame 160, a circle frame 232, a circle drive motor (not shown), a blade tilt frame (not shown), and a blade tilt cylinder (not shown). The lift cylinders 224, 226 are each coupled to the saddle linkage 150 and configured to drive movement of one or more components of the motor grader 101 (e.g., the saddle linkage 150, the draft frame 160, and/or the blade 122) in response to a change in length of the corresponding lift cylinder 224, 226. The circle side shift cylinder 228 is coupled to the saddle linkage 150 and configured to drive movement of one or more components of the grader 101 (e.g., the saddle linkage 150, the draft frame 160, and/or the blade 122) in response to a change in length of the circle side shift cylinder 228. The draft frame 160 is coupled to the lift cylinders 224, 226 and the circle side shift cylinder 228 such that the position of the draft frame 160 is substantially set or defined by the components 224, 226, 228. The circle frame 232 is coupled to the draft frame 160 for rotation relative thereto when driven by the circle drive motor supported by the circle frame 232. The blade tilt frame is interconnected with the circle frame 232 and configured to support the blade 122 for movement relative to an underlying surface. The blade tilt cylinder is supported by the blade tilt frame and configured to drive movement of the blade tilt frame and the blade 122.

The illustrative reference station 200 is configured for placement relative to the motor grader 101 such that the reference station 200 is spaced from the motor grader 101 by a station distance SD to permit the reference station 200 to measure, locate, mark, and/or survey the motor grader 101. It should be appreciated that the station distance SD may be embodied as, or otherwise include, a reference and/or predetermined distance that facilitates measurement, location, marking, and/or surveying of the particular motor grader 101 by the particular reference station 200, at least when used in conjunction with the calibration kit 300. As such, the station distance SD may vary in dependence upon the motor grader 101 and the reference station 200 used in a particular configuration and/or implementation.

In the illustrative embodiment, the reference station 200 is embodied as, or otherwise includes, any device or collection of devices provided remotely from the motor grader 101 that is/are capable of measuring and/or locating the center C of the ball 160B based on the reference location RL of the reference element 302 as part of a calibration procedure for the motor grader 101, among other things. In one example, the reference station 200 may be embodied as, or otherwise include, a total station such as a Topcon Total Station, for example. Of course, in other embodiments, it should be appreciated that the reference station 200 may be embodied as, or otherwise include, another suitable device.

It should be apparent from the present disclosure that the reference station 200 is usable with the calibration kit 300 to perform such measurement and/or location. Additionally, it should be appreciated from the discussion below that certain activities included in, or associated with, the calibration procedure of the motor grader 101 may be performed individually by either of the reference station 200 and the motor grader 101 (e.g., a control system 600) or cooperatively by the reference station 200 and the motor grader 101. In any case, as described in greater detail below, the illustrative reference station 200 is configured to direct a light beam 201 at the reference element 302 when the reference element 302 is mounted at the reference location RL, detect a light beam 201 refracted and/or reflected by the reference element 302 when the reference element 302 is mounted at the reference location RL, and transmit a signal indicative of the detected light beam 201 to the control system 600 of the motor grader 101 (see FIG. 6) to at least partially establish a positional reference frame for calibration of the motor grader 101.

The illustrative reference station 200 is also capable of measuring and/or locating reference elements 202, 204 as part of the calibration procedure for the motor grader 101. More specifically, the reference station 200 is configured to direct light beams 201 at each of the reference elements 202, 204, detect light beams 201 refracted and/or reflected by the reference elements 202, 204, and transmit signals indicative of the detected light beams 201 to the control system 600 of the motor grader 101 to establish a positional frame for calibration of the motor grader 101, as further discussed below. Thus, during the calibration procedure contemplated by the present disclosure, the positional reference frame is established based on the locations of three points of interest (i.e., the locations of the reference elements 202, 204, 302). Of course, it should be appreciated that in other embodiments, the positional reference frame may be established based on locations of another suitable number of points of interest.

The illustrative reference elements 202, 204, 302 are each embodied as, or otherwise include, an optical element having one or more surfaces capable of reflecting and/or refracting light, such as a prism, for example. Of course, in other embodiments, it should be appreciated that each of the reference elements 202, 204, 302 may be embodied as, or otherwise include, any suitable point of reference, such as a reflective point, object, and/or structure, for example. In the illustrative embodiment, the reference elements 202, 204 are mounted, respectively, to the lift cylinders 224, 226, as shown in FIG. 2. Of course, it should be appreciated that in other embodiments, the reference elements 202, 204 may be mounted to other suitable locations.

In the illustrative embodiment, signals are transmitted between the reference station 200 and the motor grader 101 (e.g., the control system 600) in the form of radio waves. Of course, it should be appreciated that in other embodiments, signals may be transmitted between the reference station 200 and the motor grader 101 in another suitable form. In any case, the motor grader 101 illustratively includes antennas 210, 212 mounted to the operator cab 110 to establish a communication interface between the reference station 200 and the motor grader 101. The antennas 210, 212 are illustratively embodied as, or otherwise include, Global Navigation Satellite System (GNSS) antennas, such as Global Positioning System (GPS) antennas, for example. However, in other embodiments, it should be appreciated that the antennas 210, 212 may embody, or otherwise include, other suitable antennas.

Figures 4, 5:
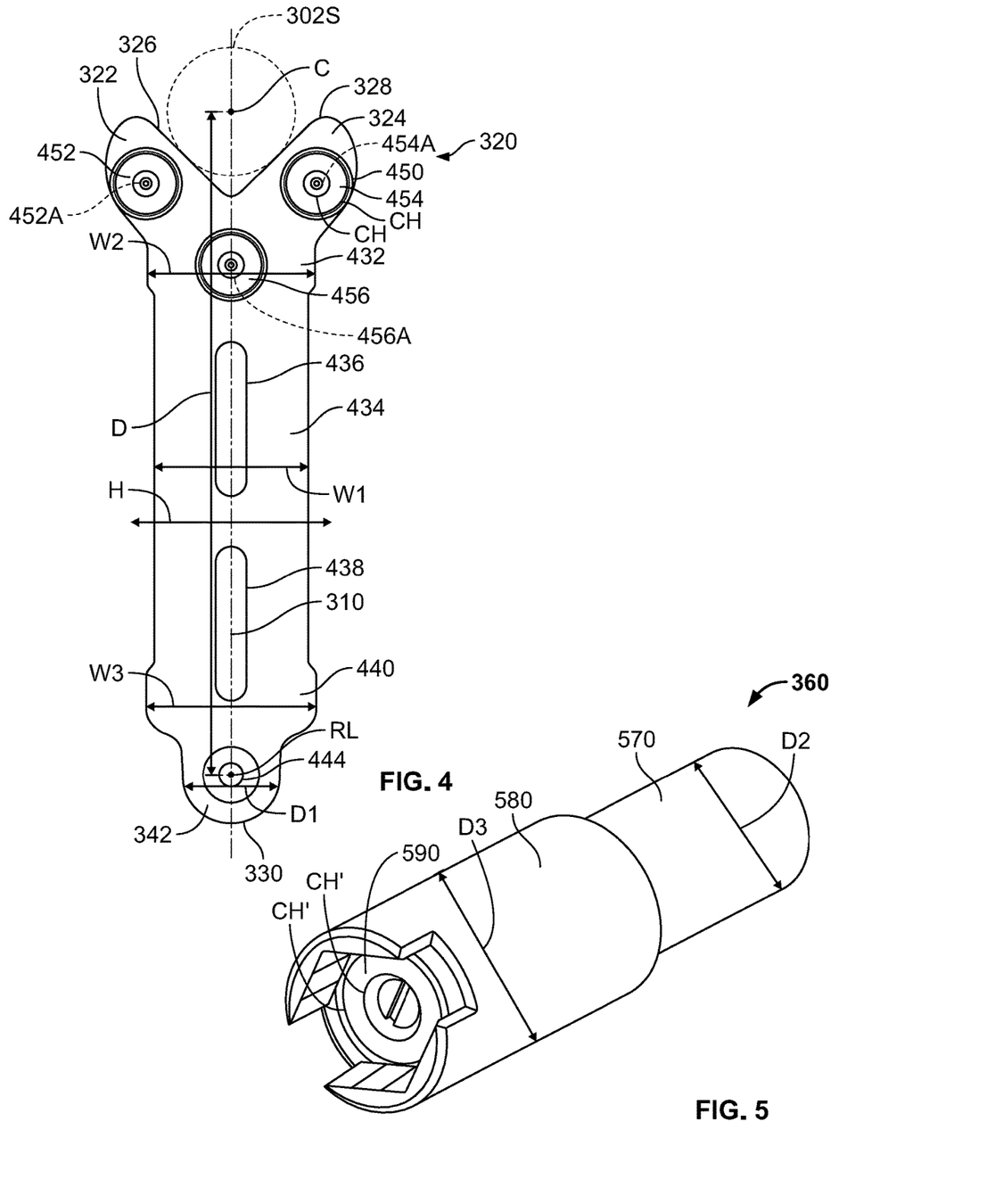
FIG. 4 is a front elevation view of a bracket of the calibration kit shown in FIG. 3 with three magnets coupled to the bracket.
FIG. 5 is a perspective view of an alignment pin of the calibration kit shown in FIG. 3 with a magnet coupled to the alignment pin.

Referring now to FIGS. 3-5, the calibration kit 300 is mounted to the motor grader 101 (see FIG. 3), a bracket 320 of the calibration kit 300 is de-coupled from the motor grader 101 (see FIG. 4), and an alignment pin 360 of the calibration kit 300 is de-coupled from the motor grader 101 (see FIG. 5). It should be appreciated that for the purposes of the present disclosure, use of the calibration kit 300 is associated with, or otherwise corresponds to, mounting of the calibration kit 300 to the motor grader 101 as described below with reference to FIG. 3. For the sake of simplicity, however, certain features of the illustrative bracket 320 and the illustrative alignment pin 360 are described below with reference to FIGS. 4 and 5 without mention of mounting of the calibration kit 300 to the motor grader 101.

In the illustrative embodiment, when the calibration kit 300 is mounted to the motor grader 101, the bracket 320 interfaces with a mounting structure 302S of the socket 102S as shown in FIG. 3. That is, crown projections 322, 324 of the bracket 320 cooperate to define a V-shaped groove 326 that contact and/or receives the mounting structure 302S. Additionally, when the calibration kit 300 is mounted to the motor grader 101, the alignment pin 360 extends outwardly from the chassis 102 and interfaces with the bracket 320 to align the bracket 320 with the ball 160B in a horizontal direction indicated by arrow H. When the mounting structure 302S interfaces with the V-shaped groove 326 and the bracket 320 is aligned with the ball 160B in the horizontal direction H by the alignment pin 360, a vertical axis 310 that passes through the center C of the ball 160B bisects the bracket 320, as shown in FIGS. 3 and 4. In the illustrative embodiment, the alignment pin 360 aligns the vertical axis 310 with a vertical axis 311 of the chassis 102. As such, the reference location RL of the reference element 302 (which is retained by the bracket 320 as discussed below) relative to the center C of the ball 160B corresponds to a vertical distance D between the reference element 302 and the center C when the calibration kit 300 is mounted to the motor grader 101.

In some embodiments, the ball 160B includes, or is otherwise embodied as, a chalice 160C. In such embodiments, when the calibration kit 300 is mounted to the motor grader 101, the reference location RL of the reference element 302 relative to the center C of the ball 160 may correspond to a vertical distance between the reference element 302 and the chalice 160C when the calibration kit 300 is mounted to the motor grader 101.

In the illustrative embodiment, the bracket 320 has an end 328 and an end 330 arranged opposite the end 328. When the calibration kit 300 is mounted to the motor grader 101, the bracket 320 contacts and/or receives the mounting structure 302S adjacent the end 328 and retains the reference element 302 at the reference location RL adjacent the end 330. When the reference element 302 is retained at the reference location RL by the bracket 320, the vertical axis 310 passes through the reference element 302 as shown in FIGS. 3 and 4.

As best seen in FIG. 4, the crown projections 322, 324 illustratively cooperate to define the end 328 of the bracket 320. A lowermost flange 342 illustratively defines the end 330 of the bracket 320. The flange 342 is formed to include an aperture 444 to retain the reference element 302 such that the reference element 302 is retained by the flange 342 at the reference location RL in use of the calibration kit 300.

The illustrative bracket 320 includes a transition section 432, a body 434, and a transition section 440 as shown in FIG. 4. The transition section 432 is interconnected with each of the crown projections 322, 324 and the body 434 such that the transition section 432 extends downwardly from the crown projections 322, 324 to the body 434. The body 434 is interconnected with the transition section 440 such that the body 434 extends downwardly from the transition section 432 to the transition section 440. The body 434 is formed to include slots 436, 438. The transition section 440 is interconnected with the flange 342 such that the transition section 440 extends downwardly from the body 434 to the flange 342.

In the illustrative embodiment, the body 434 of the bracket 320 has a width W1, the transition section 432 of the bracket 320 has a width W2, the transition section 440 of the bracket 320 has a width W3, and the flange 342 of the bracket 320 has a diameter D1. Each of the widths W2, W3 is illustratively greater than the width W1, and the diameter D1 is illustratively less than the width W1. The width W2 is substantially the same as the width W3.

The illustrative bracket 320 is constructed of one or more magnetic alloys to facilitate interaction with bracket magnets 450 discussed below. In the illustrative embodiment, the one or more magnetic alloys are embodied as, or otherwise include, one or more alloys capable of exhibiting spontaneous magnetization, such as one or more ferromagnetic or ferrimagnetic materials, for example. Furthermore, in the illustrative embodiment, the one or more magnetic alloys are embodied as, or otherwise include, one or more alloys capable of magnetic interaction with Neodymium material in use of the calibration kit 300.

The illustrative calibration kit 300 includes bracket magnets 450 as best seen in FIG. 4. The bracket magnets 450 (which are obscured by the bracket 320 in FIG. 3) are configured to attach the bracket 320 to the chassis 102 in use of the calibration kit 300. In the illustrative embodiment, the bracket magnets 450 include three magnets 452, 454, 456. Of course, it should be appreciated that in other embodiments, the bracket magnets 450 may include another suitable number of magnets.

In the illustrative embodiment, each of the bracket magnets 452, 454, 456 is embodied as, or otherwise includes, a ring magnet formed from one or more alloys including Neodymium, iron, and/or boron. Moreover, in the illustrative embodiment, each of the bracket magnets 452, 454, 456 is formed to include a single or double countersunk hole CH. Of course, it should be appreciated that in other embodiments, each of the bracket magnets 452, 454, 456 may be embodied as, or otherwise include, another suitable magnet. Regardless, the bracket magnets 452, 454, 456 are sized to be retained with respective apertures 452A, 454A, 456A formed in the bracket 320.

The illustrative bracket magnets 452, 454 at least partially couple respective crown projections 322, 324 of the bracket 320 to the chassis 102 in use of the calibration kit 300. As such, the bracket magnets 452, 454 may be referred to herein as crown projection magnets 452, 454. The illustrative bracket magnet 456 at least partially couples the transition section 432 to the chassis 102 in use of the calibration kit 300. Accordingly, the bracket magnet 456 may be referred to herein as the transition section magnet 456. In any case, the transition section magnet 456 is positioned beneath each of the crown projection magnets 452, 454 in the illustrative configuration shown in FIG. 4. In that configuration, the crown projection magnets 452, 454 and the transition section magnet 456 are arranged on the bracket 320 to form a V-shape. Of course, it should be appreciated that in other embodiments, the crown projection magnets 452, 454 and the transition section magnet 456 may have another suitable arrangement on the bracket 320 in use of the calibration kit 300.

As best seen in FIG. 5, the illustrative alignment pin 360 has a cylindrical shape and includes a neck 570 and a shoulder 580 interconnected with the neck 570. The neck 570 has a diameter D2 and the shoulder 580 has a diameter D3 that is greater than the diameter D2. In use of the calibration kit 300, the alignment pin 360 is mounted to the chassis 102 such that the shoulder 580 faces the chassis 102 and interacts directly therewith. Additionally, in use of the calibration kit 300, the neck 570 interacts with the body 434 of the illustrative bracket 320 to align the bracket 320 with the ball 160B of the draft frame 160 in the horizontal direction H.

The illustrative alignment pin 360 is constructed of one or more magnetic alloys to facilitate interaction with an alignment pin magnet 590 discussed below. In the illustrative embodiment, the one or more magnetic alloys are embodied as, or otherwise include, one or more alloys capable of exhibiting spontaneous magnetization, such as one or more ferromagnetic or ferrimagnetic materials, for example. Furthermore, in the illustrative embodiment, the one or more magnetic alloys are embodied as, or otherwise include, one or more alloys capable of magnetic interaction with Neodymium material in use of the calibration kit 300.

The illustrative calibration kit 300 includes the alignment pin magnet 590 as best seen in FIG. 5. The alignment pin magnet 590 (which is obscured by the alignment pin 360 in FIG. 3) is configured to attach the alignment pin 360 to the chassis 102 in use of the calibration kit 300. In the illustrative embodiment, the alignment pin magnet 590 includes a single magnet. Of course, it should be appreciated that in other embodiments, the alignment pin magnet 590 may include another suitable number of magnets.

In the illustrative embodiment, the alignment pin magnet 590 is embodied as, or otherwise includes, a ring magnet formed from one or more alloys including Neodymium, iron, and/or boron. Moreover, in the illustrative embodiment, the alignment pin magnet 590 is formed to include a single or double countersunk hole CH'. Of course, it should be appreciated that in other embodiments, the alignment pin magnet 590 may be embodied as, or otherwise include, another suitable magnet. Regardless, the alignment pin magnet 590 is sized to be retained in the shoulder 580 of the alignment pin 360.

The illustrative alignment pin magnet 590 at least partially couples the shoulder 580 of the alignment pin 360 to the chassis 102 in use of the calibration kit 300. As such, the alignment pin magnet 590 may be referred to herein as a shoulder magnet 590. Of course, it should be appreciated that in other embodiments, the shoulder magnet 590 may be used to couple the alignment pin 360 to the chassis 102 in use of the calibration kit 300 in another suitable manner.

Figure 6:
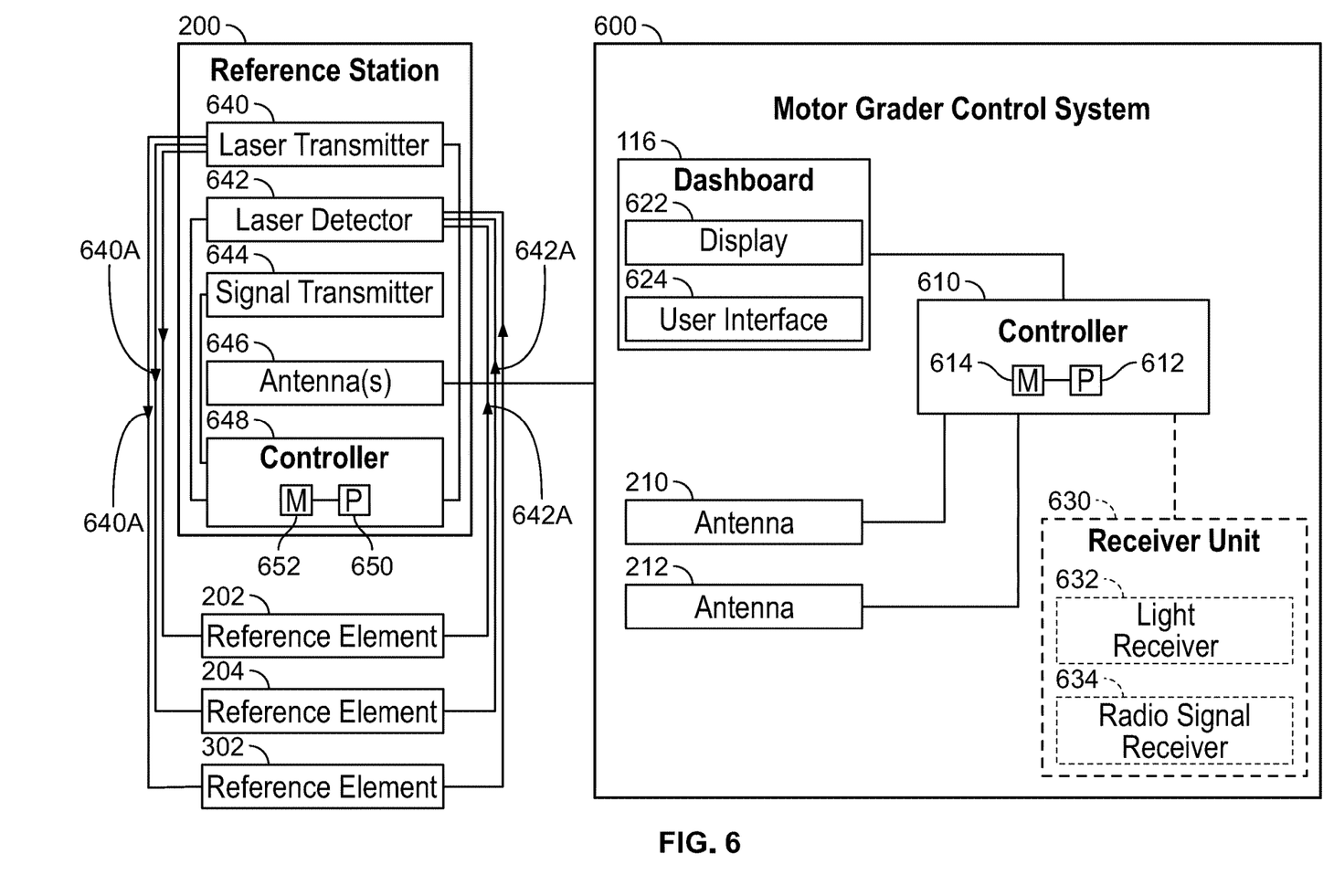
FIG. 6 is a diagrammatic view of a motor grader control system and a reference station adapted for calibration of the motor grader shown in FIG. 1.

Referring now to FIG. 6, the illustrative control system 600, which may be used to control operation of some components of the motor grader 101 in some embodiments, is coupled to and adapted for use with the reference station 200 as indicated above. In the illustrative embodiment, the control system 600 includes a controller 610, the dashboard 116 coupled to the controller 610, and the antennas 210, 212 coupled to the controller 610. Additionally, in some embodiments, the control system 600 may include a receiver unit 630 coupled to the controller 610.

The illustrative controller 610 includes a processor 612. The processor 612 may be embodied as, or otherwise include, any type of processor, controller, or other compute circuit capable of performing various tasks such as compute functions and/or controlling the functions of the motor grader 101 and/or the reference station 200. For example, the processor 612 may be embodied as a single or multi-core processor(s), a microcontroller, or other processor or processing/controlling circuit. In some embodiments, the processor 612 may be embodied as, include, or be coupled to an FPGA, an application specific integrated circuit (ASIC), reconfigurable hardware or hardware circuitry, or other specialized hardware to facilitate performance of the functions described herein. Additionally, in some embodiments, the processor 612 may be embodied as, or otherwise include, a high-power processor, an accelerator co-processor, or a storage controller. In some embodiments still, the processor 612 may include more than one processor, controller, or compute circuit.

The illustrative controller 610 also includes a memory device 614 coupled to the processor 612. The memory device 614 may be embodied as any type of volatile (e.g., dynamic random access memory (DRAM), etc.) or nonvolatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In some embodiments, the memory device 614 may be embodied as a block addressable memory, such as those based on NAND or NOR technologies. The memory device 614 may also include future generation nonvolatile devices, such as a three dimensional crosspoint memory device (e.g., Intel 3D XPoint™ memory), or other byte addressable write-in-place nonvolatile memory devices. In some embodiments, the memory device 614 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

The dashboard 116 of the illustrative control system 600 includes a display 622 and a user interface 624. The display 622 is configured to output or display various indications, messages, and/or prompts to an operator, which may be generated by the control system 600. The user interface 624 is configured to provide various inputs to the control system 600 based on various actions, which may include actions performed by an operator.

The receiver unit 630 may be included in the control system 600 in some embodiments as indicated above. Of course, it should be appreciated that in other embodiments, the receiver unit 630 may be omitted from the control system 600. The receiver unit 630 may be configured to receive light and/or energy originating from the reference station 200, at least in some embodiments. As such, the receiver unit 630 may include a light receiver 632 that is embodied as, or otherwise includes, a photocell or other suitable sensor (not shown) capable of detecting light and/or energy originating from the reference station 200. Additionally, at least in some embodiments, the receiver unit 630 may be configured to receive radio signals transmitted from the reference station 200. Therefore, the receiver unit 630 may include a radio signal receiver 634 capable of receiving radio signals transmitted and/or broadcast from the reference station 200.

Of course, it should be appreciated that the control system 600 may include components in addition to, and/or in lieu of, the components depicted in FIG. 6. However, for the sake of simplicity, discussion of those additional and/or alternative components is omitted.

In the illustrative embodiment, the reference station 200 includes a laser transmitter 640, a laser detector 642, a radio signal transmitter 644, one or more antennas 646, and a controller 648. Each of the laser transmitter 640, the laser detector 642, the radio signal transmitter 644, and the one or more antennas 646 is coupled to the controller 648. Of course, it should be appreciated that the reference station 200 may include components in addition to, and/or in lieu of, the components depicted in FIG. 6. However, for the sake of simplicity, discussion of those additional and/or alternative components is omitted.

The laser transmitter 640 of the illustrative reference station 200 is embodied as, or otherwise includes, any device or collection of devices capable of producing a light and/or energy beam and directing the light and/or energy beam at each of the reference elements 202, 204, 302 in use of the reference station 200 as indicated by arrows 640A. The laser detector 642 of the illustrative reference station 200 is embodied as, or otherwise includes, any device or collection of devices capable of detecting a light and/or energy beam refracted and/or reflected back to the reference station 200 from the reference elements 202, 204, 302 in use of the reference station 200 as indicated by arrows 642A. The radio signal transmitter 644 of the illustrative reference station 200 is embodied as, or otherwise includes, any device or collection of devices capable of transmitting and/or broadcasting one or more signals indicative of light and/or energy beams detected by the reference station 200 (i.e., the laser detector 642) to the controller 610 via the one or more antennas 646 and the antennas 210, 212. The one or more antennas 646 are each substantially identical to the antennas 210, 212 discussed above. The one or more antennas 646 are configured to cooperate with the antennas 210, 212 to establish a communication interface between the reference station 200 and the control system 600 in use of the reference station 200 and the motor grader 101.

The controller 648 of the illustrative reference station 200 is adapted to control operation of some components of the reference station 200, at least in some embodiments. The controller 648 includes a processor 650 and a memory device 652 coupled to the processor 650. The processor 650 may be embodied as, or otherwise include, any type of processor, controller, or other compute circuit capable of performing various tasks such as compute functions and/or controlling the functions of the reference station 200. The processor 650 may therefore be similar to the processor 612 of the controller 610. The memory device 652 may be embodied as any type of volatile (e.g., dynamic random access memory (DRAM), etc.) or non-volatile memory capable of storing data therein. The memory device 652 may therefore be similar to the memory device 614 of the controller 610.

Figure 7:
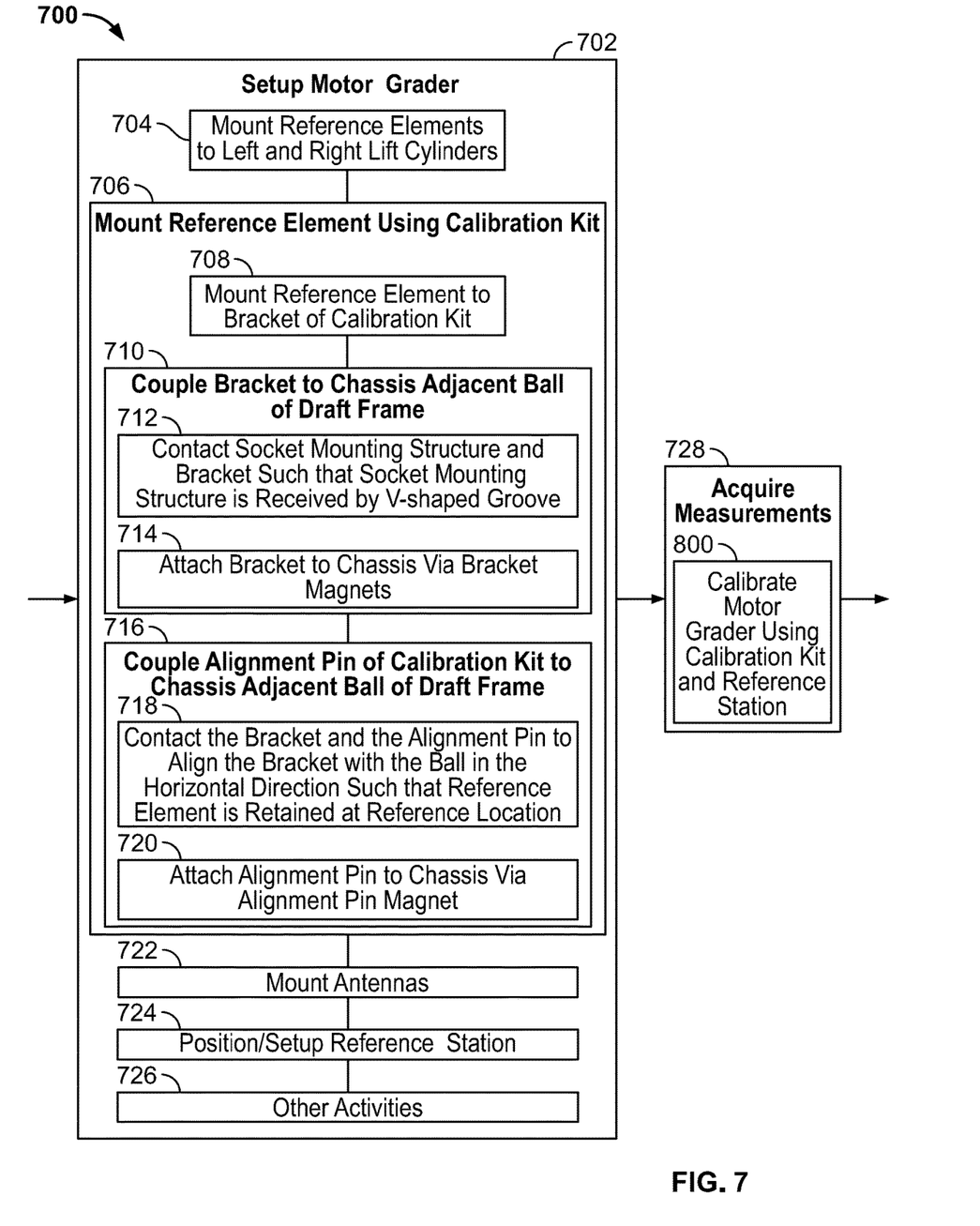
FIG. 7 is a simplified flowchart of a method of operating a motor grader that may be performed by the motor grader control system shown in FIG. 6.

Referring now to FIG. 7, an illustrative method 700 of operating the motor grader 101 may be embodied as, or otherwise include, a set of instructions that are executable by the control system 600 (i.e., the controller 610) or the reference station 200 (i.e., the controller 648). It should be appreciated, however, that in some embodiments, the illustrative method 700 may be cooperatively performed by the controller 610 and the controller 648. In such embodiments, performance of the illustrative method 700 may be associated with communication and/or coordination between the controller 610 and the controller 648. In any case, the method 700 corresponds to, or is otherwise associated with, performance of the blocks described below in the illustrative sequence of FIG. 7. It should be appreciated, however, that the method 700 may be performed in one or more sequences different from the illustrative sequence.

In addition, it should be appreciated that the blocks described below in the illustrative sequence of FIG. 7 may prompt, direct, or otherwise be associated with one or more actions performed by an operator of the motor grader 101 in use thereof. For example, the blocks may correspond to, or otherwise be associated with, prompts that are displayed on the display 622 to prompt and/or direct operator action in use of the motor grader 101. Accordingly, performance of the blocks of the illustrative method 700 may be associated with, or otherwise include, a control component (e.g., one or more actions performed/directed by the controller 610 and/or the controller 648) and/or an operator component (e.g., one or more actions performed by an operator in response to the control component). For ease of discussion, however, the blocks of the illustrative method 700 are described below as control components without reference to corresponding operator components.

The illustrative method 700 begins with block 702. In block 702, the controller 610 and/or the controller 648 performs setup of the motor grader 101. To do so, the controller 610 and/or the controller 648 performs blocks 704, 706, 722, 724, and 726. Blocks 704, 706, 722, 724, and 726 of the illustrative method 700 are described below.

To perform setup of the motor grader 101 in block 702 of the illustrative method 700, the controller 610 and/or the controller 648 performs block 704. In block 704, the controller 610 and/or the controller 648 mounts (or directs mounting of) the reference elements 202, 204 to the respective lift cylinders 224, 226. From block 704, the method 700 subsequently proceeds to block 706.

To perform setup of the motor grader 101 in block 702 of the illustrative method 700, the controller 610 and/or the controller 648 performs block 706. In block 706, the controller 610 and/or the controller 648 mounts (or directs mounting of) the reference element 302 using the calibration kit 300. To perform block 706, the controller 610 and/or the controller 648 performs blocks 708, 710, and 716 which are described below.

To mount (or direct mounting of) the reference element 302 in block 706 of the illustrative method 700, the controller 610 and/or the controller 648 performs block 708. In block 708, the controller 610 and/or the controller 648 mounts (or directs mounting of) the reference element 302 to the flange 342 of the bracket 320. From block 708, the method 700 subsequently proceeds to block 710.

To mount (or direct mounting of) the reference element 302 in block 706 of the illustrative method 700, the controller 610 and/or the controller 648 performs block 710 in which the controller 610 and/or the controller 648 couples (or directs coupling of) the bracket 320 to the chassis 102 adjacent the ball 160B of the draft frame 160. To perform block 710, the controller 610 and/or the controller 648 performs blocks 712 and 714. In block 712, the controller 610 and/or the controller 648 contacts (or directs contact to be made between) the mounting structure 302S of the socket 102S and the bracket 320 such that the mounting structure 302 contacts and/or is received by the groove 326 of the bracket 320. In block 714, the controller 610 and/or the controller 648 attaches (or directs attachment of) the bracket 320 to the chassis 102 adjacent the ball 160B via the bracket magnets 452, 454, 456. From block 714, the method 700 subsequently proceeds to block 716.

To mount (or direct mounting of) the reference element 302 in block 706 of the illustrative method 700, the controller 610 and/or the controller 648 performs block 716 in which the controller 610 and/or the controller 648 couples (or directs coupling of) the alignment pin 360 to the chassis 102 adjacent the ball 160B of the draft frame 160. To perform block 716, the controller 610 and/or the controller 648 performs blocks 718 and 720. In block 718, the controller 610 and/or the controller 648 contacts (or directs contact to be made between) the bracket 320 and the alignment pin 360 to align the bracket 320 with the ball 160B in the horizontal direction H such that the reference element 302 is retained at the reference location RL. In block 720, the controller 610 and/or the controller 648 attaches (or directs attachment of) the alignment pin 360 to the chassis 102 adjacent the ball 160B via the alignment pin magnet 590. From block 720, the method 700 subsequently proceeds to block 722.

To perform setup of the motor grader 101 in block 702 of the illustrative method 700, the controller 610 and/or the controller 648 performs block 722. In block 722, the controller 610 and/or the controller 648 mounts (or directs mounting of) the antennas 210, 212 to the operator cab 110. From block 722, the method 700 subsequently proceeds to block 724.

To perform setup of the motor grader 101 in block 702 of the illustrative method 700, the controller 610 and/or the controller 648 performs block 724. In block 724, the controller 610 and/or the controller 648 positions (or directs positioning of) the reference station 200 relative to the motor grader 101. It should be appreciated that in block 724, the controller 610 and/or the controller 648 may position (or direct positioning of) the reference station 200 relative to the motor grader 101 such that the reference station 200 is spaced from the grader 101 by the station distance SD. Furthermore, it should be appreciated that in block 724, the controller 610 and/or the controller 648 may perform (or direct performance of) various functions and/or activities associated with, included in, or otherwise related to, setup of the reference station 200. In any case, from block 724, the method 700 subsequently proceeds to block 726.

To perform setup of the motor grader 101 in block 702 of the illustrative method 700, the controller 610 and/or the controller 648 performs block 726. In block 726, the controller 610 and/or the controller 648 performs (or directs performance of) various additional activities and/or functions associated with setup of the motor grader 101. Those additional activities may include, but are not limited to, any one of the following: setup of one or more access points; configuring the lift cylinders 224, 226 for one or more operating modes; configuring the blade 122 for one or more operating modes; and mounting an inertial measurement unit or IMU (not shown) to the motor grader 101. Regardless, performance of block 726 may be associated with, or otherwise correspond to, completion of the block 702. Subsequent to completion of block 702, the method 700 proceeds to block 728.

Figure 8:
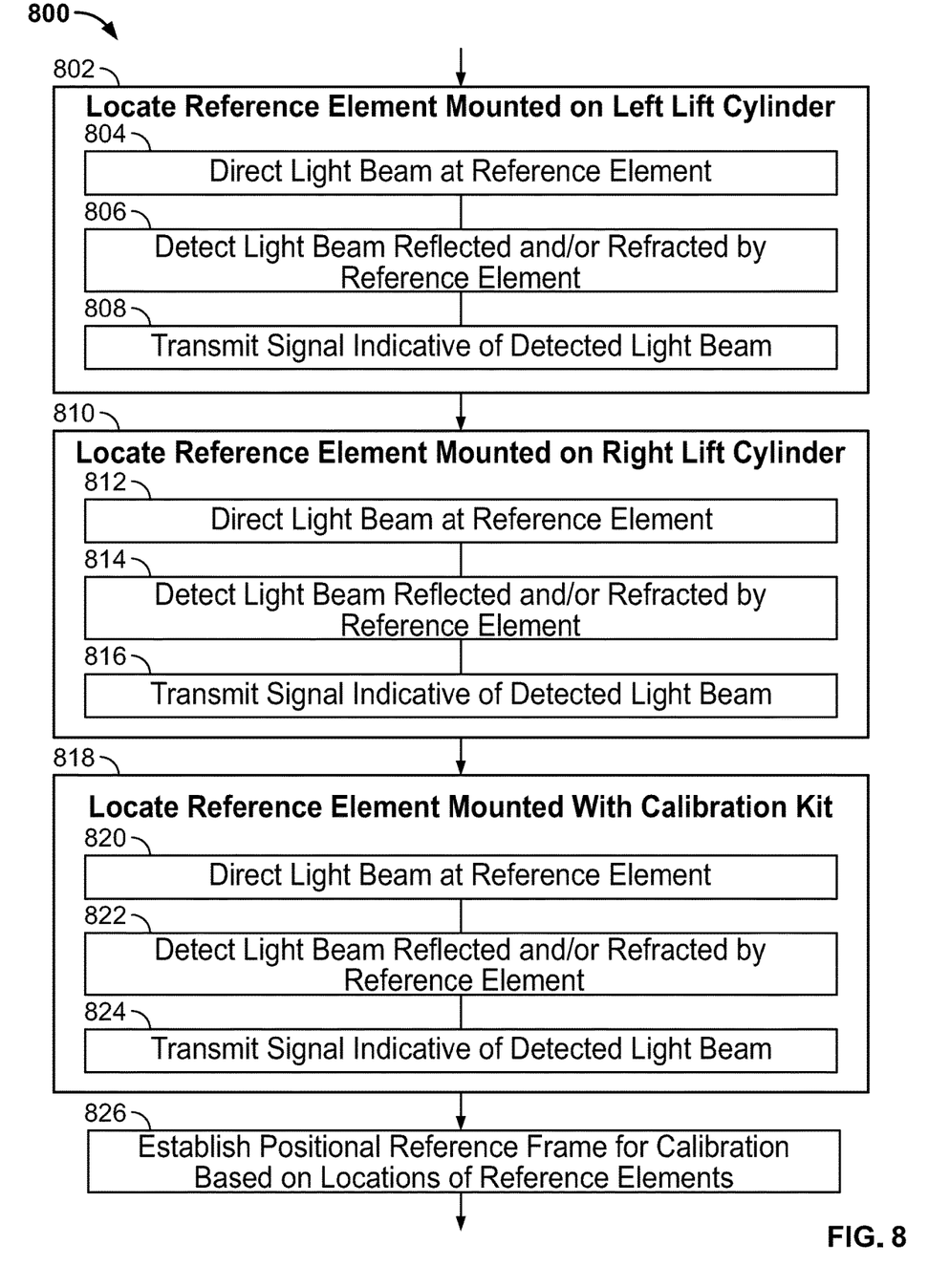
FIG. 8 is a simplified flowchart of a method of calibrating a motor grader that may be performed by the motor grader control system when performing the method of FIG. 7.

In block 728 of the illustrative method 700, the controller 610 and/or the controller 648 acquires (or directs acquisition of) measurements to spatially locate the motor grader 101 and various components thereof. To do so, the controller 610 and/or the controller 648 performs a method 800 in which the controller 610 and/or the controller 648 calibrates (or directs calibration of) the motor grader 101 using the calibration kit 300 and the reference station 200.

Referring now to FIG. 8, the illustrative method 800 of calibrating the motor grader 101 may be embodied as, or otherwise include, a set of instructions that are executable by the control system 600 (i.e., the controller 610) or the reference station 200 (i.e., the controller 648). It should be appreciated, however, that in some embodiments, the illustrative method 800 may be cooperatively performed by the controller 610 and the controller 648. In such embodiments, performance of the illustrative method 800 may be associated with communication and/or coordination between the controller 610 and the controller 648. In any case, the method 800 corresponds to, or is otherwise associated with, performance of the blocks described below in the illustrative sequence of FIG. 8. It should be appreciated, however, that the method 800 may be performed in one or more sequences different from the illustrative sequence.

The illustrative method 800 begins with block 802. In block 802, the controller 610 and/or the controller 648 locates (or directs location of) the reference element 202 that is mounted on the lift cylinder 224. To do so, the controller 610 and/or the controller 648 performs blocks 804, 806, and 808. In block 804, the controller 610 and/or the controller 648 directs (or causes the laser transmitter 640 to direct) a light and/or energy beam at the reference element 202. In block 806, the controller 610 and/or the controller 648 detects (or causes the laser detector 642 to detect) the light and/or energy beam reflected and/or refracted by the reference element 202. In block 808, the controller 610 and/or the controller 648 transmits (or causes the radio signal transmitter 644 to transmit) one or more signals indicative of the detected light and/or energy beam from the reference element 202 to at least one of the controller 610 and the controller 648. From block 808, the method 800 subsequently proceeds to block 810.

In block 810 of the illustrative method 800, the controller 610 and/or the controller 648 locates (or directs location of) the reference element 204 that is mounted on the lift cylinder 226. To do so, the controller 610 and/or the controller 648 performs blocks 812, 814, and 816. In block 812, the controller 610 and/or the controller 648 directs (or causes the laser transmitter 640 to direct) a light and/or energy beam at the reference element 204. In block 814, the controller 610 and/or the controller 648 detects (or causes the laser detector 642 to detect) the light and/or energy beam reflected and/or refracted by the reference element 204. In block 816, the controller 610 and/or the controller 648 transmits (or causes the radio signal transmitter 644 to transmit) one or more signals indicative of the detected light and/or energy beam from the reference element 204 to at least one of the controller 610 and the controller 648. From block 816, the method 800 subsequently proceeds to block 818.

In block 818 of the illustrative method 800, the controller 610 and/or the controller 648 locates (or directs location of) the reference element 302 that is mounted to the chassis 102 with the calibration kit 300. To do so, the controller 610 and/or the controller 648 performs blocks 820, 822, and 824. In block 820, the controller 610 and/or the controller 648 directs (or causes the laser transmitter 640 to direct) a light and/or energy beam at the reference element 302. In block 822, the controller 610 and/or the controller 648 detects (or causes the laser detector 642 to detect) the light and/or energy beam reflected and/or refracted by the reference element 302. In block 824, the controller 610 and/or the controller 648 transmits (or causes the radio signal transmitter 644 to transmit) one or more signals indicative of the detected light and/or energy beam from the reference element 302 to at least one of the controller 610 and the controller 648. From block 824, the method 800 subsequently proceeds to block 826.

In block 826 of the illustrative method 800, the controller 610 and/or the controller 648 establishes (or directs establishment of) a positional reference frame for calibration of the motor grader 101 based on the locations of the reference elements 202, 204, 302 associated with blocks 802, 810, 818, respectively. Thus, as indicated above, the controller 610 and/or the controller 648 establish (or direct establishment of) the positional reference frame in block 826 based on three points of interest. In some embodiments, performance of the block 826 may correspond to, or otherwise be associated with, completion of one iteration of the method 800.

It should be apparent from the present disclosure that the calibration kit 300 is adapted for use with equipment used in one or more of a variety of applications as suggested above. As such, it should be appreciated that the calibration kit 300 (e.g., the bracket 320 and the alignment pin 360) are not limited to the forms and/or geometries expressly described in the present disclosure, and may have different forms and/or geometries. In some embodiments, the bracket 320 may be embodied as, or otherwise include, any component capable of directly contacting, receiving, or otherwise interfacing with, a circular machine surface to determine and/or measure a central and/or lateral distance between two points (e.g., one point on or adjacent to the machine surface and another point spaced from the machine surface). Additionally, in some embodiments, the calibration kit 300 (e.g., the bracket 320 and/or the alignment pin 360) may be configured to contact or otherwise interface with one or more machine surfaces to determine and/or measure rotation. In some embodiments still, the calibration kit 300 may be embodied as, or otherwise include, any component or collection of components capable of facilitating measurement of movement and/or position of a device from an external and/or remote source (e.g., the reference station 200). In some embodiments yet still, the calibration kit 300 may be embodied as, or otherwise include, any component or collection of components capable of temporary attachment to a device to calibrate the device.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A machine comprising:
a chassis having a first coupling element;
a frame having a second coupling element configured for interaction with the first coupling element to pivotally couple the frame to the chassis; and
a calibration kit coupled to the chassis adjacent the second coupling element, wherein the calibration kit is configured to facilitate measurement of a center of the second coupling element of the frame to at least partially establish a positional reference frame for calibration of the machine, and wherein the calibration kit is configured to retain a reference element at a reference location relative to the center of the second coupling element of the frame so that the reference location of the reference element may be used to measure the center of the second coupling element of the frame in use of the calibration kit.

2. The machine of claim 1, wherein the calibration kit comprises a bracket having a pair of crown projections that cooperate to define a V-shaped groove sized to interface with a mounting structure of the first coupling element in use of the calibration kit.

3. The machine of claim 2, wherein when the mounting structure interfaces with the V-shaped groove of the bracket in use of the calibration kit and the bracket is aligned with the second coupling element of the frame in a horizontal direction, a vertical axis that passes through the center of the second coupling element of the frame bisects the bracket.

4. The machine of claim 3, wherein the calibration kit comprises an alignment pin that extends outwardly from the chassis and interfaces with the bracket to align the vertical axis that bisects the bracket with a vertical axis of a main frame of the machine in use of the calibration kit.

5. The machine of claim 4, wherein when the mounting structure interfaces with the V-shaped groove of the bracket and the bracket is aligned with the second coupling element of the frame in the horizontal direction by the alignment pin in use of the calibration kit, the reference location of the reference element relative to the center of the second coupling element of the frame corresponds to a vertical distance between the reference element and the center of the second coupling element of the frame.

6. The machine of claim 1, wherein the calibration kit comprises a bracket having a first end and a second end arranged opposite the first end, and wherein the bracket receives a mounting structure of the first coupling element adjacent the first end and retains the reference element at the reference location adjacent the second end in use of the calibration kit.

7. The machine of claim 6, wherein the bracket includes a pair of crown projections that cooperatively define the first end and a V-shaped groove sized to receive the mounting structure of the first coupling element, and wherein each of the pair of crown projections is coupled to the chassis by a crown projection magnet in use of the calibration kit.

8. The machine of claim 7, wherein the bracket includes a transition section that extends downwardly from the pair of crown projections, and wherein the transition section is coupled to the chassis by a transition section magnet positioned beneath each of the crown projection magnets in use of the calibration kit.

9. The machine of claim 8, wherein the crown projection magnets and the transition magnet are arranged on the bracket to form a V-shape in use of the calibration kit.

10. The machine of claim 1, wherein the calibration kit comprises an alignment pin that extends outwardly from the chassis and includes a neck having a first diameter and a shoulder interconnected with the neck that has a second diameter greater than the first diameter.

11. The machine of claim 10, wherein the shoulder is coupled to the chassis by a shoulder magnet in use of the calibration kit.

12. A calibration kit for a machine including a chassis having a first coupling element and a frame having a second coupling element sized for receipt by the first coupling element to pivotally couple the frame to the chassis, the calibration kit comprising:
a bracket configured for attachment to the chassis that has a pair of crown projections that cooperate to define a V-shaped groove sized to interface with a mounting structure of the first coupling element in use of the calibration kit, wherein the bracket is configured to retain a reference element in use of the calibration kit; and an alignment pin configured for attachment to the chassis in use of the calibration kit, wherein the alignment pin is configured to interface with the bracket to align the bracket with the second coupling element of the frame in a horizontal direction in use of the calibration kit.

13. The calibration kit of claim 12, wherein the bracket and the alignment pin cooperate to retain the reference element at a reference location relative to a center of the second coupling element of the frame so that the reference location of the reference element may be used to measure the center of the second coupling element of the frame in use of the calibration kit.

14. The calibration kit of claim 12, wherein the bracket comprises:

a body that extends downwardly away from the pair of crown projections and is formed to include two slots; and a lowermost flange that extends downwardly away from the body and is formed to include an aperture to retain the reference element in use of the calibration kit.

15. The calibration kit of claim 14, wherein the alignment pin comprises:

a neck having a first diameter; and a shoulder interconnected with the neck that has a second diameter greater than the first diameter.

16. The calibration kit of claim 15, wherein the calibration kit comprises:

a plurality of bracket magnets configured to attach the bracket to the chassis in use of the calibration kit, wherein the plurality of bracket magnets include three magnets; and an alignment pin magnet configured to attach the alignment pin to the chassis in use of the calibration kit.

17. A method of operating a machine including a chassis having a first coupling element and a frame having a second coupling element sized for receipt by the first coupling element to pivotally couple the frame to the chassis, the method comprising:

mounting a reference element to a bracket of a calibration kit;

coupling the bracket to the chassis adjacent the second coupling element; and coupling an alignment pin of the calibration kit to the chassis adjacent the second coupling element to interact with the bracket such that the reference element is retained by the bracket at a reference location relative to a center of the second coupling element of the frame.

18. The method of claim 17, wherein coupling the bracket to the chassis adjacent the second coupling element comprises contacting a mounting structure of the first coupling element with the bracket such that the mounting structure interfaces with a V-shaped groove defined by a pair of crown projections of the bracket.

19. The method of claim 18, wherein coupling the alignment pin to the chassis adjacent the second coupling element to interact with the bracket comprises contacting the bracket with the alignment pin to align a vertical axis that bisects the bracket with a vertical axis of a main frame of the machine in use of the calibration kit such that the reference location of the reference element relative to the center of the second coupling element of the frame corresponds to a vertical distance between the reference element and the center of the second coupling element of the draft frame.

20. The method of claim 19, comprising:

directing a light beam at the reference element when the reference element is at the reference location;

detecting the light beam refracted by the reference element when the reference element is at the reference location; and transmitting a signal indicative of the detected light beam to a controller of the machine to at least partially establish a positional reference frame for calibration of the machine.

\* \* \* \* \*